Patented Apr. 19, 1938

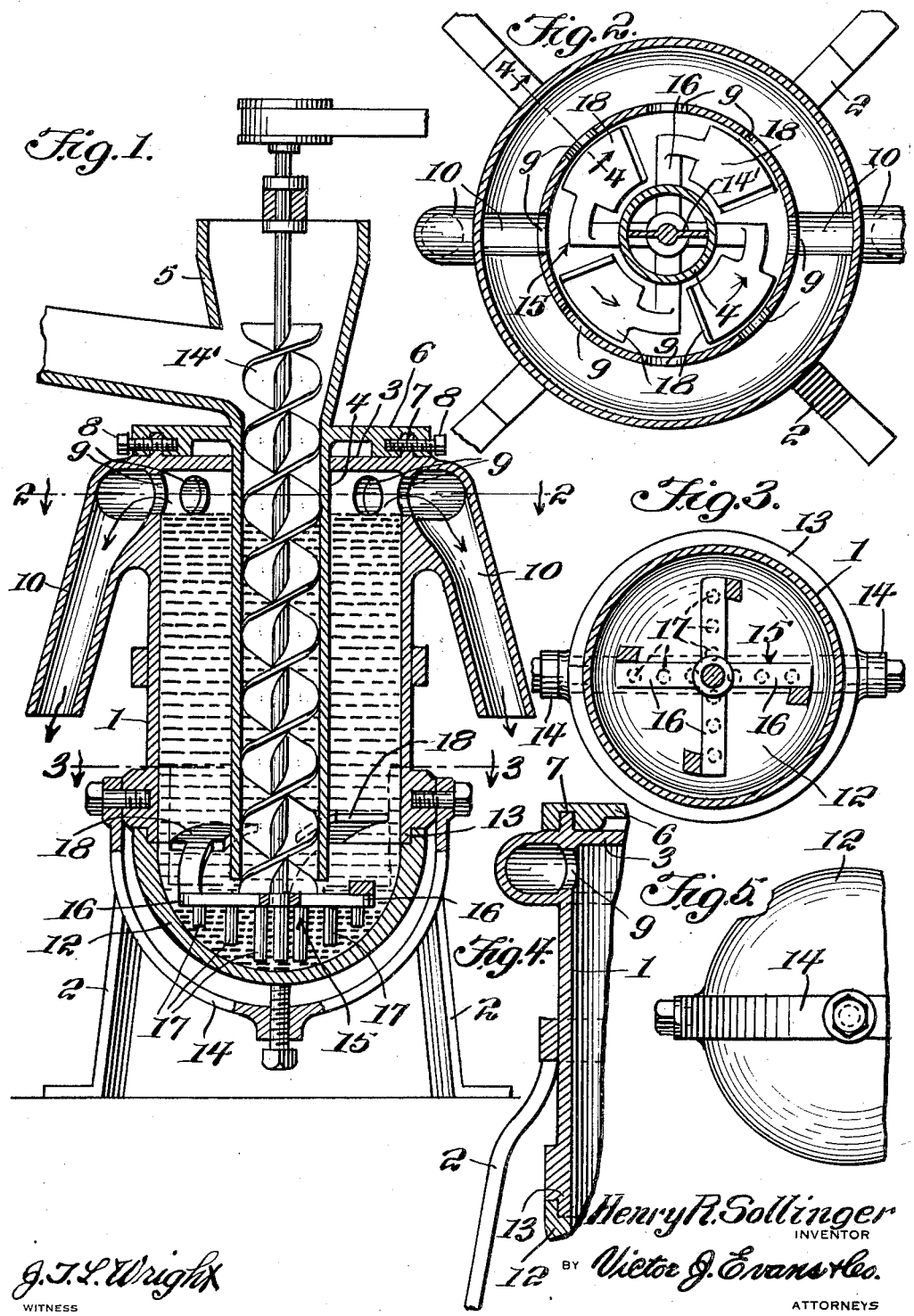

2,114,547

UNITED STATES PATENT OFFICE 2,114,547

PLACER MIXING MACHINE

Henry R. Sollinger, Hoquiam, Wash., assignor of one-fourth to Sam Bielec and one-fourth to Chas. W. Smith, Hoquiam, Wash., and one-half to Mastin Taylor, Yakima, Wash.

Application April 22, 1936, Serial No. 75,808

2 Claims. (Cl. 209—184)

This invention relates to separators and more particularly to a machine especially adapted for efficiently and economically separating gold from other materials, and has for the primary object the provision of a device of this character whereby all materials entering the device will be positively driven into a given area and thoroughly agitated to separate the gold from the other materials, the latter being driven away from the gold and out of the device by the agitating means.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a vertical sectional view illustrating the separator constructed in accordance with my invention.

Figure 2 is a sectional view taken on the line 2—2 of Figure 1.

Figure 3 is a sectional view taken on the line 3—3 of Figure 1.

Figure 4 is a fragmentary sectional view taken on the line 4—4 of Figure 2.

Figure 5 is a fragmentary bottom plan view showing means of releasably securing the collecting bowl to the container or body of the device.

Referring in detail to the drawing, the numeral 1 indicates a body or container of cylindrical formation supported in a vertical position by a stand 2. The upper end of the body or container is closed by a top wall 3 centrally apertured to permit a conveyor tube 4 to depend downwardly in the body or container. Extending laterally from the upper portion of the conveyor tube is a hopper 5. A plate 6 is formed on the upper portion of the conveyor tube and rests upon the wall 3 and is grooved to receive an annular flange 7 formed on the wall 3. Bolts or like fasteners 8 extend through the flange 7 and the grooved portion of the plate 6 and have threaded connection with the latter.

A series of outlets 9 are formed in the body or container 1 adjacent the wall 3 and place a series of discharge spouts 10 in communication with the interior of the container or body. The spouts 10 form an integral part of the body or container and extend outwardly and downwardly therefrom.

A bowl-shaped collecting receptacle 12 is grooved to receive the flanged lower end 13 of the body or container and provides a closure for the lower end of said body or container and is held in engagement therewith by a bail 14. The bail is easily adjusted to permit the application and removal of the collecting receptacle 12 from the body or container.

The lower end of the conveyor tube terminates within the collecting receptacle 12.

A conveyor 14 of the auger type is journaled in the conveyor tube and carries at its lower end an agitator 15 operating in the collecting receptacle. The upper end of the conveyor extends exteriorly of the conveyor tube and is adapted to have any suitable power means connected thereto.

The agitator 15 consists of a plurality of radially extending arms 16 suitably secured to the conveyor and have secured thereto pins or fingers 17 arranged in depending position. Secured to the ends of the arms and operating in a plane above said arms are blades 18. The blades are pitched to force upwardly in the body or container materials contacting therewith.

The collecting receptacle 12 has therein mercury and the materials containing fluid to be separated are placed in the hopper and the latter feeds the conveyor by gravitation. The conveyor being of the auger type positively feeds the materials downwardly into the collecting receptacle where said materials are engaged by the agitator 15 and thoroughly mixed, the gold being taken up or held by the mercury, while the other materials due to the arrangement of the blades are forced upwardly in the container or body and escape by way of the spouts 10. While I have described the collecting receptacle 12 having mercury therein it is to be understood that in many instances this machine will successfully operate without mercury in the receptacle 12 due to the fact that the gold will become separated from the other materials due to the agitator, the gold settling to the bottom of the collecting receptacle while the other materials rise and discharge by way of the spouts 10.

Having described the invention, I claim:

1. A separator comprising a vertically arranged container, discharge means at the upper end of said container, a collecting receptacle closing the lower end of the container, a tubular feeding member supported axially of the container with the lower end thereof terminating above the bottom of the receptacle, a screw conveyor including a shaft rotatable in said feeding member, the shaft of said conveyor extending below the lower end of the feeding member, radial arms secured to said shaft below said feeding member, dependent pins secured to said arms, and upwardly curved blades secured to the upper sides of said arms and adapted upon rotation of said shaft to force the material upwardly in said container.

2. A separator comprising a vertically arranged container, discharge means at the upper end of said container, a collecting receptacle closing the lower end of the container, a tubular feeding member supported axially of the container with the lower end thereof terminating above the bottom of the receptacle, a screw conveyor including a shaft rotatable in said feeding member, the shaft of said conveyor extending below the lower end of the feeding member, radial arms secured to said shaft below said feeding member, dependent pins secured to said arms, and upwardly curved blades secured to the upper sides of said arms and engaging between said container and said feeding member and adapted upon rotation of said shaft to force the material upwardly in said container.

HENRY R. SOLLINGER.